United States Patent
Sakuda et al.

(10) Patent No.: US 8,503,014 B2
(45) Date of Patent: Aug. 6, 2013

(54) GATEWAY

(75) Inventors: Kenji Sakuda, Suwa (JP); Yasuhiro Oshima, Matsumoto (JP); Takafumi Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 589 days.

(21) Appl. No.: 12/757,887

(22) Filed: Apr. 9, 2010

(65) Prior Publication Data

US 2010/0259788 A1    Oct. 14, 2010

(30) Foreign Application Priority Data

Apr. 10, 2009 (JP) ................................. 2009-096236

(51) Int. Cl.
*G06F 3/12* (2006.01)

(52) U.S. Cl.
USPC ........... 358/1.15; 358/1.13; 713/153; 726/12; 370/400; 370/401

(58) Field of Classification Search
USPC ................. 358/1.13, 1.15; 713/153; 726/12; 370/400, 401
See application file for complete search history.

(56) References Cited

U.S. PATENT DOCUMENTS

| | | | |
|---|---|---|---|
| 2002/0055896 A1* | 5/2002 | Mimoto | 705/30 |
| 2005/0221807 A1 | 10/2005 | Karlsson et al. | |
| 2006/0136596 A1* | 6/2006 | Izumi | 709/230 |
| 2006/0155864 A1 | 7/2006 | Izumi | |
| 2007/0229889 A1* | 10/2007 | Henry et al. | 358/1.15 |
| 2010/0253962 A1* | 10/2010 | Higuchi et al. | 358/1.13 |

FOREIGN PATENT DOCUMENTS

| | | |
|---|---|---|
| JP | 2003-143352 A | 5/2003 |
| JP | 2003-178028 A | 6/2003 |
| JP | 2004-147128 A | 5/2004 |
| JP | 2004-187262 A | 7/2004 |
| JP | 2005-109701 A | 4/2005 |
| JP | 2005-516320 A | 6/2005 |
| WO | WO 03/065701 A1 | 8/2003 |

* cited by examiner

*Primary Examiner* — Jacky X Zheng

(74) *Attorney, Agent, or Firm* — Kilpatrick Townsend & Stockton LLP (57) ABSTRACT

A gateway converts a signal between a transmitting terminal capable of transmitting printable print contents in accordance with a FAX protocol and a receiving terminal capable of receiving the print contents in accordance with an HTTP protocol and printing the print contents.

3 Claims, 8 Drawing Sheets

[S170] SDP OF INVITE MESSAGE m=application 8080 TCP newprint1
C=IN IP xxx.xxx.xxx.xxx
a=setup:passive
a=connection:new
a=control: newprint/capability.xml

FIG. 5

[S210] SDP OF 200 OK MESSAGE m=application 3180 TCP newprint1
a=setup:active
a=connection:new

FIG. 6

[S360] REQUEST FOR TRANSMITTING SIDE ABILITY

01:GET /newprint/capability.xml HTTP/1.1
02:HOST: xxx.xxx.xxx.xxx
03:Accept: text/xml

FIG. 7

[S370] RESPONSE TO TRANSMITTING SIDE ABILITY

```
01:HTTP/1.1 200 OK
02:Content-Type:text/xml charset="utf-8"
03:Content-Length:****
04:CONNECTION: close
05:
06:<?xml version="1.0" encoding="utf-8" ?>
07:<root xmlns:a="urn:schemas-newprint:device-1-0">
08:  <a:deviceCapability>
09:    <a:capabilityVariable>
10:      <a:name>MediaSize</a:name>
11:      <a:alloewdValueList>
14:        <a:allowedValue>iso_A4_210x297mm</a:allowedValue>
16:      </a:alloewdValueList>
17:    </a:capabilityVariable>
18:    <a:capabilityVariable>
19:      <a:name>PrintQuality</a:name>
20:      <a:alloewdValueList>
21:        <a:allowedValue>200x200</a:allowedValue>
24:      </a:alloewdValueList>
25:    </a:capabilityVariable>
26:    <a:capabilityVariable>
27:      <a:name>DocumentFormat</a:name>
28:      <a:alloewdValueList>
29:        <a:allowedValue>img/tiff</a:allowedValue>
30:      </a:alloewdValueList>
31:    </a:capabilityVariable>
32:    <a:capabilityVariable>
33:      <a:name>MonoColor</a:name>
34:      <a:alloewdValueList>
35:        <a:allowedValue>color</a:allowedValue>
37:      </a:alloewdValueList>
38:    </a:capabilityVariable>
39:    <a:httpRequest>Get</a:httpRequest>
40:  </a:deviceCapability>
41:  <a:documentInfo>
42:    <a:nextCapabilityURL>newprint/capability1.xml</a:nextCapabilityURL>
43:    <a:nortifyStatusURL>newprint/event/<a:nortifyStatusURL>
44:  </a:documentInfo>
45:</root>
```

FIG. 8

[S450] REQUEST FOR PAGE INFORMATION

```
01:GET /newprint/capability1.xml HTTP/1.1
02:HOST: xxx.xxx.xxx.xxx
03:Accept: text/xml
```

FIG. 9

[S460] RESPONSE TO PAGE INFORMATION

```
01:HTTP/1.1 200 OK
02:Content-Type:text/xml charset="utf-8"
03:Content-Length:****
04:CONNECTION: close
05:
06:<?xml version="1.0" encoding="utf-8" ?>
07:<root xmlns:a="urn:schemas-newprint:device-1-0">
08:  <a:documentInfo>
09:    <a:documentURL>newprint/scanprint.tiff</a:documentURL>
10:    <a:nextCapabilityURL>newprint/capability2.xml</a:nextCapabilityURL>
11:  </a:documentInfo>
12:</root>
```

FIG. 10

[S470] REQUEST FOR DATA

```
01:GET /newprint/scanprint.tiff?MediaSize=iso_A4_210x297mm&PrintQuality=
      200x200&DocumentFormat=img/tiff&MonoColor=color HTTP/1.1
02:HOST: xxx.xxx.xxx.xxx
03:Accept: image/tiff
```

FIG. 11

[S640] RESPONSE TO PAGE INFORMATION

```
01:HTTP/1.1 200 OK
02:Content-Type:text/xml charset="utf-8"
03:Content-Length:****
04:CONNECTION: close
05:
06:<?xml version="1.0" encoding="utf-8" ?>
07:<root xmlns:a="urn:schemas-newprint:device-1-0">
08:  <a:documentInfo>
09:    <a:documentURL>none</a:documentURL>
10:    <a:nextCapabilityURL>none</a:nextCapabilityURL>
11:  </a:documentInfo>
12:</root>
```

GATEWAY

The entire disclosure of Japanese Patent Application No. 2009-096236, filed Apr. 10, 2009 is expressly incorporated by reference herein.

BACKGROUND

1. Technical Field

The present invention relates to a gateway.

2. Related Art

In the past, there was known a personal computer connected to a facsimile (FAX) apparatus or a printer which receives print data via a communication network such as a telephone line or the Internet and performs printing. The FAX apparatus receiving the print data via the telephone line responds to a call by use of a FAX signal and performs the printing or stores the print data to perform the printing, whenever receiving the print data. The personal computer receiving the print data via the Internet stores the print data in an external storage device such as a hard disk drive, and then activates a printing application to read and print the print data stored in the external storage device. JP-A-2005-109701, JP-A-2003-178028, and JP-T-2005-516320 disclose techniques for transmitting information via a network.

However, it is considered that print data can be transmitted and received directly between printers being connected to an IP (Internet Protocol) network and having an individual IP address without involving a personal computer in the future. In this case, as a protocol for transmitting and receiving the print data, the HTTP (HyperText Transfer Protocol) can be used. On the other hand, the FAX apparatus is generally connected to an IP network or a PSTN (Public Switched Telephone Network) to transmit and receive the print data. At this time, the FAX protocol is used. For this reason, even when the FAX apparatus is connected to the same network, for example, the print data may not be transmitted to the printer which transmits and receives the print data to and from the FAX apparatus by use of the HTTP.

SUMMARY

An advantage of some aspects of the invention is that it provides a technique for transmitting print contents from a transmitting terminal capable of transmitting the print contents by use of a FAX protocol to a receiving terminal capable of receiving and printing the print contents by use of the HTTP.

Aspects of the invention will be described below.

According to an aspect of the invention, there is provided a gateway converting a signal between a transmitting terminal capable of transmitting printable print contents in accordance with a FAX protocol and a receiving terminal capable of receiving the print contents in accordance with an HTTP protocol and printing the print contents. The gateway includes: a memory unit which temporarily stores data; a connection establishing unit which establishes connection between the transmitting terminal and the receiving terminal on the basis of reception of a connection request signal transmitted from the transmitting terminal; and a print contents transmitting/receiving unit which stores the print contents in the memory unit when receiving the print contents in a format used in the FAX protocol from the transmitting terminal after the connection establishing unit establishes the connection and which converts the print contents stored in the memory unit into data of the format used in the HTTP protocol, and transmits the converted data to the receiving terminal when receiving a contents request for requesting the print contents in a format used in the HTTP protocol from the receiving terminal.

The gateway according to the aspect of the invention establishes the connection between the transmitting terminal and the receiving terminal receiving the print contents in accordance with the HTTP protocol and printing the print contents, on the basis of the reception of the connection request signal transmitted from the transmitting terminal capable of transmitting the printable print contents in accordance with the FAX protocol. When the connection is established between the transmitting terminal and the receiving terminal, the print contents are received from the transmitting terminal in the format used in the FAX protocol and the received print contents are stored in the memory unit capable of storing the received print contents temporarily. When the contents request for requesting the print contents is received from the receiving terminal in the format used in the HTTP protocol, the print contents stored in the memory unit are converted into the data of the format used in the HTTP protocol and transmitted to the receiving terminal. In this way, the print contents can be transmitted from the transmitting terminal capable of transmitting the print contents in accordance with the FAX protocol to the receiving terminal capable of receiving the print contents in accordance with the HTTP protocol and printing the print contents.

The gateway according to this aspect of the invention may further include a use capability adjusting unit which transmits predetermined receiving-side temporary capability information, which indicates a capability lower than a capability of receiving and printing the print contents by the receiving terminal, to the transmitting terminal in the format used in the FAX protocol and receives use capability information, which is determined by the transmitting terminal in a range of a transmitting side capability of transmitting the print contents by the transmitting terminal and a range of a capability expressed by the receiving-side temporary capability information and indicates a capability of transmitting and receiving the print contents, from the transmitting terminal in the format used in the FAX protocol before the print contents transmitting/receiving unit receives the print contents from the transmitting terminal and receives the contents request from the receiving terminal after the connection establishing unit establishes the connection, and which transmits the received use capability information as the transmitting-side capability information to the receiving terminal in the format used in the HTTP protocol when receiving a capability request for requesting transmitting-side capability information indicating the transmitting side capability from the receiving terminal in the format used in the HTTP protocol. When the print contents transmitting/receiving unit receives the content request accompanying a capability notification, which is given so as to transmit the print contents in accordance with a capability expressed in the use capability information, from the receiving terminal in the format used in the HTTP protocol, the print contents transmitting/receiving unit may convert the print contents stored in the memory unit into the data of the format used in the HTTP protocol and may transmit the converted data to the receiving terminal. With such a configuration, since the print contents are transmitted and received in accordance with the use capability determined in the range of the transmitting side capability and the range of the receiving side capability, the receiving terminal can receive the print contents appropriately and prints the print contents. Even when both the transmitting terminal and the receiving terminal are an apparatus capable of acquiring the capability of the connection opponent and determining the use capability, the predetermined receiving-side temporary capability information indicating the capability lower than the capability of the receiving terminal is transmitted to the transmitting terminal by the use capability adjusting unit. Therefore, the use capability determined by the transmitting terminal falls in the range of the capability of the transmitting terminal and the capability of the receiving terminal. Accordingly, the transmitting terminal can transmit and receive the print contents in accordance with the use capability and the receiving terminal can appropriately receive the print contents and print the print contents.

In the gateway according to the aspect of the invention, when the print contents transmitting/receiving unit transmits the print contents stored in the memory unit to the receiving terminal, the print contents transmitting/receiving unit may sequentially convert the stored print contents into the data of the format used in the HTTP protocol and transmits the converted data to the receiving terminal without receiving all of the print contents from the transmitting terminal and waiting the print contents for being stored in the memory unit. With such a configuration, the process of receiving the print contents and storing the print contents in the memory unit is performed together with the process of transmitting the stored print contents to the receiving terminal. Therefore, the transmission of the print contents from the transmitting terminal to the receiving terminal is completed in a short time and the storage size of the memory unit can be reduced. In this case, the print contents transmitting/receiving unit may receive next page information, which indicates whether there is next page data, from the transmitting terminal in the format used in the FAX protocol whenever receiving data corresponding to one page in the print contents from the transmitting terminal, and may transmit the next page information to the receiving terminal in the format used in the HTTP protocol when the receiving terminal makes a request in the format used in the HTTP protocol so as to transmit the next page information whenever transmitting the data corresponding to one page in the print contents to the receiving terminal. With such a configuration, whether there is the data of the next page can be notified appropriately to the receiving terminal in each page.

BRIEF DESCRIPTION OF THE DRAWINGS

The invention will be described with reference to the accompanying drawings, wherein like numbers reference like elements.

FIG. 7 is an explanatory diagram illustrating an example of the details of a transmitting side capability response.

FIG. 8 is an explanatory diagram illustrating an example of the details of a page information request.

DESCRIPTION OF EXEMPLARY EMBODIMENTS

First Embodiment

Figure 1:
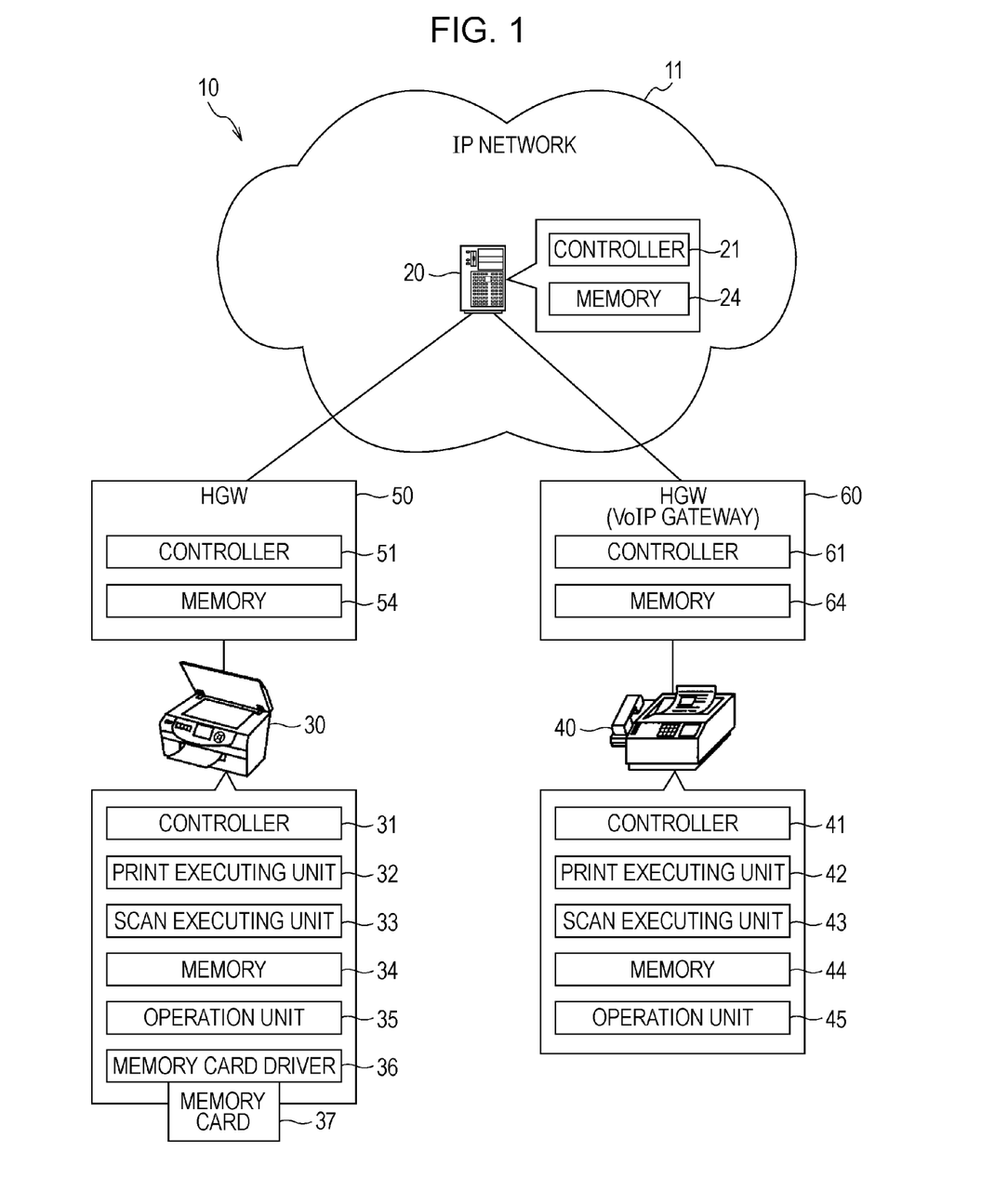
FIG. 1 is a diagram illustrating the configuration of a printing system including a gateway according to a first embodiment.

Hereinafter, a first embodiment of the invention will be described with reference to the drawings. FIG. 1 is a diagram illustrating an exemplary overall configuration of a printing system 10 including a gateway (GW) 20 according to the first embodiment. As illustrated, the printing system 10 includes an IP network 11 having the GW 20, a multi-function apparatus 30 connected to the IP network 11 via a home gateway (HGW) 50, and a FAX apparatus 40 connected to the IP network 11 via a home gateway (HGW) 60.

Since the IP network 11 is structured as the next generation network (NGN), for example, the IP network 11 includes a SIP (Session Initiation Protocol) proxy server (not shown), which relays an IP message from a user agent such as the multi-function apparatus 30 or the FAX apparatus 40 as well as the GW 20, and a location server (not shown), which stores location information (for example, a URI (Uniform Resource Identifier)) of the user agent.

The GW 20 executes protocol conversion and data conversion between data used in the HTTP and data used in a voice protocol considered as one of FAX protocols. The GW 20 is an apparatus which connects an apparatus (for example, the multi-function apparatus 30) transmitting and receiving print contents in accordance with the HTTP to an apparatus (for example, the HGW 60 and the FAX apparatus 40) transmitting and receiving the print contents in accordance with the voice protocol and which is capable of transmitting and receiving the print contents. The GW 20 includes a controller 21 controlling the entire apparatus and a memory 24 storing various programs executed by the controller 21 or storing data temporarily. The GW 20 has a function of the SIP proxy server.

The multi-function apparatus 30 is an apparatus functioning as both a scanner and a printer. The multi-function apparatus 30 is capable of transmitting and receiving the print contents containing image data in accordance with the HTTP via the IP network 11. An interface (I/F) (not shown) of the multi-function apparatus 30 is connected to the GW 20 of the IP network 11 via the HGW 50. The multi-function apparatus 30 includes: a controller 31 which controls the entire apparatus; a print executing unit 32 which prints texts data, image data, the like; a scan executing unit 33 which scans texts, images, or the like of a medium such as a paper sheet to convert the scanned texts, images, or the like into image data; a memory 34 which stores various programs executed by the controller 31, temporarily stores data to be printed, or temporarily stores the image data obtained by the scanning; an operation unit 35 which displays various kinds of information for a user or inputs various instructions from the user; and a memory card driver 36 which writes data in a memory card 37 or read data stored in the memory card 37 when the memory card 37 is connected. The print executing unit 32 is an ink jet mechanism which prints an image a print sheet on the basis of the image data by pressurizing ink of respective colors and ejecting the pressurized ink on the print sheet. A mechanism pressurizing the ink may be a mechanism which deforms piezoelectric elements or a mechanism which generates bubbles by heat of a heater. The scan executing unit 33 is a scanner mechanism which reads a document by operating a known color image sensor which emits light toward the document placed on a glass support, decomposes the reflected light into respective colors, and converts the decomposed colors into reading data.

The FAX apparatus 40 is an apparatus configured as a FAX corresponding to the G3 which transmits and receive print contents by use of the T.30, which is one of FAX protocols and is recommended by the ITU-T (International Telecommunication Union Telecommunication Standardization Sector). An interface (I/F) (not shown) of the FAX apparatus 40 is connected to the GW 20 of the IP network 11 via the HGW 60. The FAX apparatus 40 includes: a controller 41 which controls the entire apparatus; a print executing unit 42 which prints texts data, image data, the like; a scan executing unit 43 which scans texts, images, or the like of a medium such as a paper sheet to convert the scanned texts, images, or the like into image data; a memory 44 which stores various programs executed by the controller 41, temporarily stores data to be printed, or temporarily stores the image data obtained by the scanning; and an operation unit 45 which displays various kinds of information for a user or inputs various instructions from the user. The print executing unit 42 is a full-color electrographic printing device which uses a single photoconductive method and an intermediate transfer method and which develops an electro latent image of each color image, transfers the electrostatic latent image to a print sheet, and heats the electrostatic latent image to be adhered. The scan executing unit 43 is a scanner mechanism which reads a document by operating a known color image sensor which emits light toward the document, decomposes the reflected light into respective colors, and converts the decomposed colors into reading data.

The HGW 50 is an apparatus which is installed between the multi-function apparatus 30 and the IP network 11 and has a function of a router and a function of converting a protocol and data. The HGW 50 includes a controller 51 which controls the entire apparatus and a memory 54 which stores various programs executed by the controller 51 or temporarily stores data. The multi-function apparatus 30 is capable of transmitting and receiving data in accordance with the HTTP. Therefore, the HGW 50 just relays data without converting a protocol, when the multi-function apparatus 30 transmits and receives the data to and from the IP network 11. Another apparatus (for example, a printer or an IP telephone) other than the multi-function apparatus 30 may be connected to the HGW 50.

The HGW 60 is an apparatus which is installed between the FAX apparatus 40 and the IP network 11 and has a function of a router and a function of converting a protocol and data, like the HGW 50. The HGW 60 includes a controller 61 which controls the entire apparatus and a memory 64 which stores various programs executed by the controller 61 or temporarily stores data. Since the HGW 60 is connected to the FAX apparatus 40 and the telephone line, the HGW 60 has a function of a VoIP (Voice over Internet Protocol) gateway. That is, the HGW 60 converts analog signals of the T.30 protocol, which can be transmitted and received by the FAX apparatus 40, into IP packets of a voice protocol considered as one of the FAX protocols usable in the IP network 11 and vice versa, so that the FAX apparatus 40 can transmit and receive print contents via the IP network 11.

Figure 2:
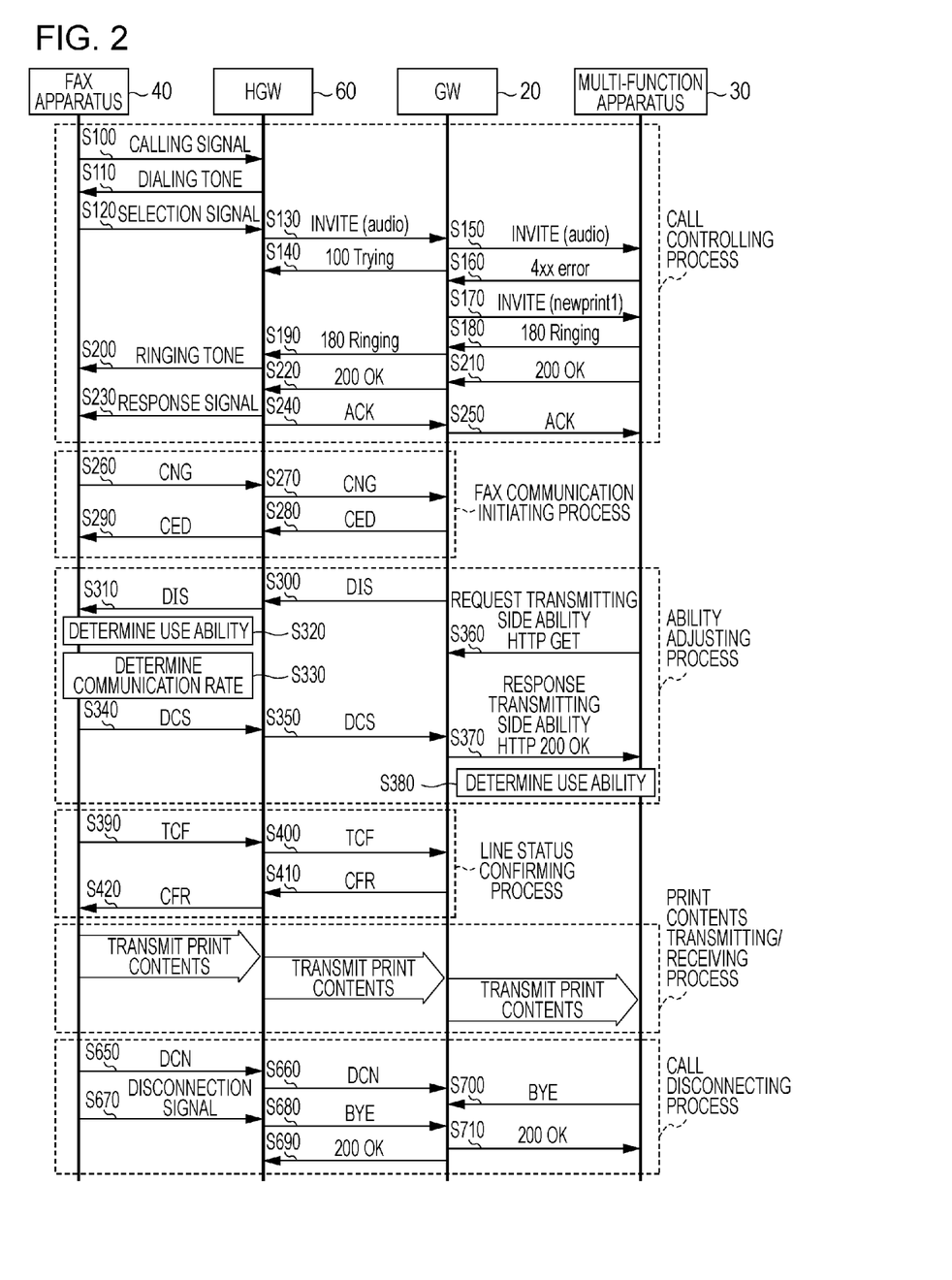
FIG. 2 is an explanatory diagram illustrating a sequence in which a FAX apparatus and a multi-function apparatus operate according to the first embodiment.
Figure 3:
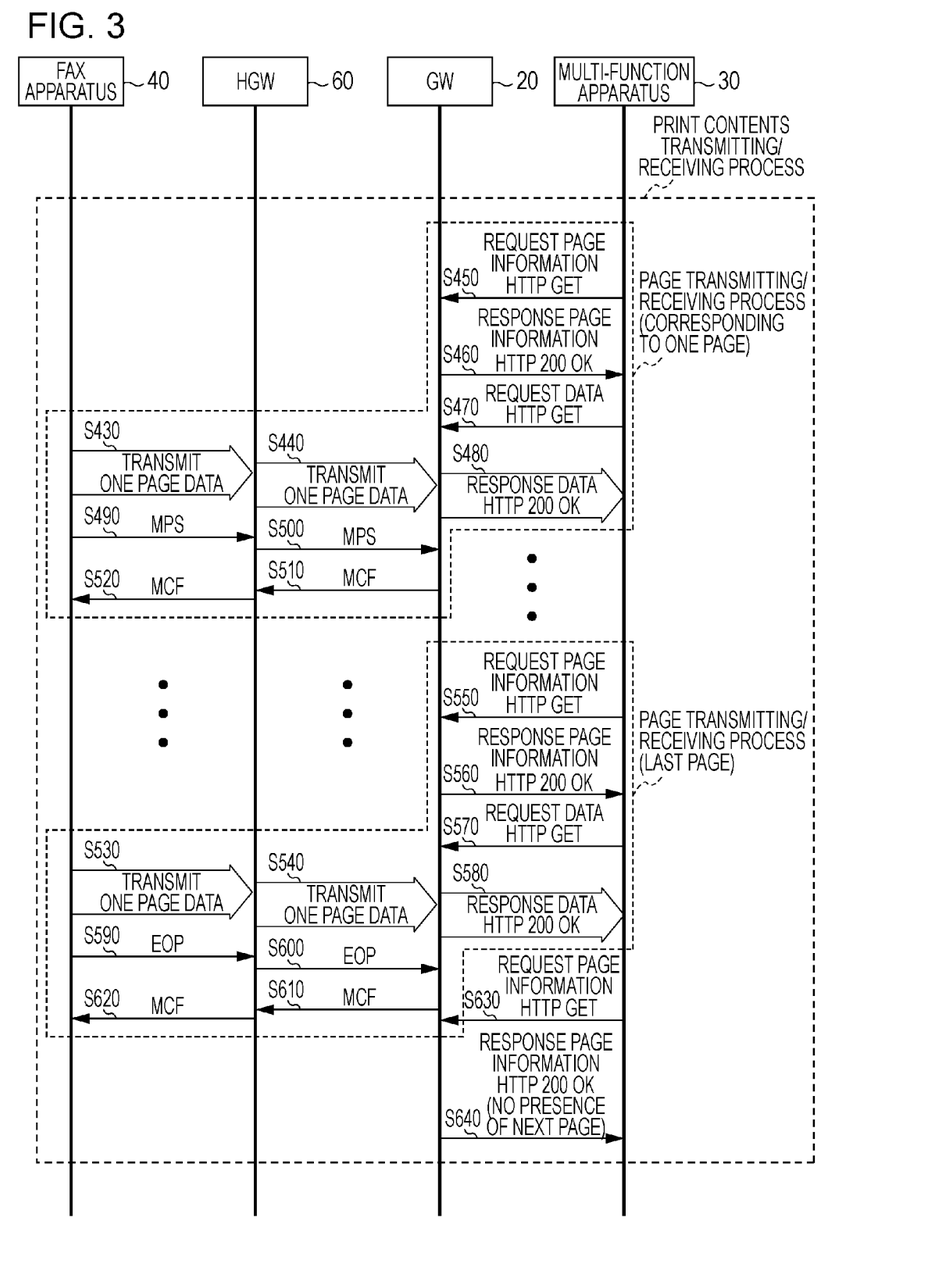
FIG. 3 is an explanatory diagram illustrating a sequence of a process of transmitting and receiving print contents.

Next, the operation of the GW 20 having the above-described configuration according to this embodiment, and particularly, the operation of the GW 20 upon transmitting the print contents from the FAX apparatus 40 to the multi-function apparatus 30 will be described. FIG. 2 is an explanatory diagram illustrating a sequence in which the FAX apparatus 40 and the multi-function apparatus 30 establish connection via the HGW 60 and the GW 20, the print contents are transmitted and received, and then the connection is cut. FIG. 3 is an explanatory diagram illustrating a sequence of a process of transmitting and receiving the print contents to transmit and receive the print contents in effect in the sequence of FIG. 2. In FIGS. 2 and 3, the description of the HGW 50 is omitted. However, the multi-function apparatus 30 and the GW 20 transmit and receive the data via the HGW 50 in effect.

The transmission of the print contents from the FAX apparatus 40 to the multi-function apparatus 30 is performed such that a user of the FAX apparatus 40 sets a document describing the print contents, which is desired to be transmitted by the user wants, in the scan executing unit 43, inputs unique identity information (for example, a number) assigned to the multi-function apparatus 30, which is a transmission destination, by operating the operation unit 45, and then presses down a sending button (not shown). When the user presses down the sending button, the controller 41 of the FAX apparatus 40 first transmits a calling signal to the HGW 60 to perform a call controlling process of establishing connection with the multi-function apparatus 30 to which the identity information input by the user is assigned (step S100). When the FAX apparatus 40 receives a dialing tone transmitted from the HGW 60 receiving the calling signal (step S110), the controller 41 transmits the identity information input by the user as a selection signal to the HGW 60 (step S120).

The HGW 60 receiving the selection signal transmits an INVITE message to the GW 20 to establish session in accordance with the SIP with the multi-function apparatus 30 to which the identity information input by the user can be assigned (step S130). An SDP (Session Description Protocol) in the INVITE message describes "audio" in an "m=" line. Here, the "m=" line indicates information on the kinds of media or a transport address. The description of "audio" in the "m=" line functions as identification of containing the transmission and reception of the print contents in accordance with the voice protocol.

When the GW 20 receives the INVITE message, the controller 21 transmits "100 Trying", which indicates a status code meaning that a process is being performed, as a response to the HGW 60 (step S140). The controller 21 also transmits the INVITE message to the multi-function apparatus 30 by specifying the URI of the multi-function apparatus 30 on the basis of the unique identity information of the multi-function apparatus 30 described in the header of the INVITE message (step S150). The specifying of URI of the multi-function apparatus 30 on the basis of the unique identity information of the multi-function apparatus 30 can be carried out by transmitting the identity information to the location server of the IP network 11 and acquiring the URI corresponding to the identity information, for example.

When the multi-function apparatus 30 receives the INVITE message, the controller 31 transmits "4xx error", which is a status code meaning a request failure, to the GW 20 serving as the transmitting side (step S160). Since the "m=" line of the INVITE message received by the multi-function apparatus 30 describes "audio", as described above, the INVITE message means that the transmitting side requests transmission and reception of the print contents in accordance with the voice protocol to the multi-function apparatus 30. However, the multi-function apparatus 30 may not respond to the request, since the multi-function apparatus 30 transmits and receives the print contents in accordance with the HTTP. For this reason, the multi-function apparatus 30 replies to the INVITE message by transmitting "4xx error" in which the "m=" line describes "audio".

When the GW 20 receives "4xx error", the controller 21 determines that the terminal transmitting the print contents does not respond to the transmission and reception of the print contents in accordance with the voice protocol, and then transmits an INVITE message, in which a "m=" line does not describe "audio" but describes "newprint1" and which is different from the INVITE message transmitted to the multi-function apparatus 30 in step S130, to the multi-function apparatus 30 (step S170).

Figure 4:
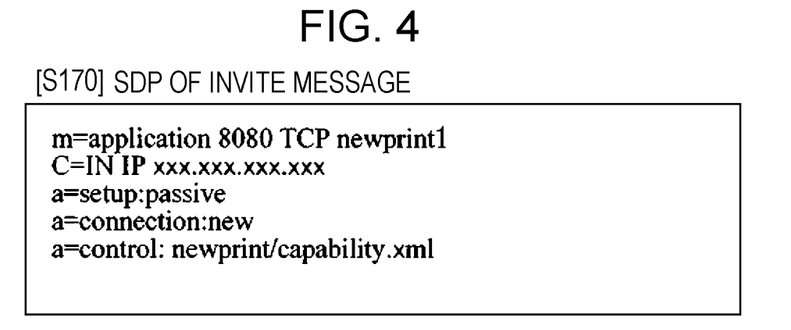
FIG. 4 is an explanatory diagram illustrating an example of the details of an SDP of an INVITE message.

FIG. 4 is a diagram illustrating an example of the details of the SDP in the INVITE message transmitted in step S170 by the GW 20. The SDP in FIG. 4 includes a media description part. The "m=" line in FIG. 4 describes that the port number of an application defined as payload type "newprint1" using "the TCP (Transmission Control Protocol) is "8080". The description of "newprint1" in the "m=" line functions as identification of containing the transmission and reception of the print contents in accordance with the HTTP. The description of "newprin1" means that the terminal transmitting the print contents functions as a server in a server-client mode and the terminal receiving the print contents functions as a client in the server-client mode. Therefore, the print contents are transmitted and received in accordance with the HTTP. From "a=setup:passive" in FIG. 4, it can be also known that the GW 20, which is the terminal transmitting the print contents, functions as a passive side (server). In the SDP, a "C=" line describes the address of the media contained in the session. That is, the "C=" line in FIG. 4 describes "IN IP xxx.xxx.xxx.xxx". Therefore, it can be known that the IP address of the FAX apparatus 40 serving as the transmitting terminal is "xxx.xxx.xxx.xxx". The last line "a=" in FIG. 4 describes "newprint/capability.xml", which is the URL of the initial request from the terminal receiving the print contents after the establishment of the session. According to this description, the transmitting terminal functioning as the client in the server-client model can initially acquire the URL of the capability request to the GW 20.

When the multi-function apparatus 30 receives the INVITE message of step S170, the controller 31 transmits "180 Ringing", which is the a status code meaning that a ringing process is being performed, as a response to the GW 20 so as to establish the session in accordance with the SIP in order to transmits and receive the print contents in accordance with the HTTP (step S180). Subsequently, when the controller 21 of the GW 20 receives "180 Ringing", the controller 21 transmits "180 Ringing" to the HGW 60 (step S190). The controller 61 of the HGW 60 transmits a ringing tone meaning that the ringing process is being performed" to the FAX apparatus 40 (step S200). On the other hand, the controller 31 of the multi-function apparatus 30 transmits "180 Ringing" of step S180, the controller 31 prepares the session establishment and then transmits "200 OK", which is a status code meaning success in the ringing for establishing the session, to the GW 20 (step S210). When the controller 21 of the GW 20 receives "200 OK", the controller 21 transmits the "200 OK" to the HGW 60 (step S220).

Figure 5:
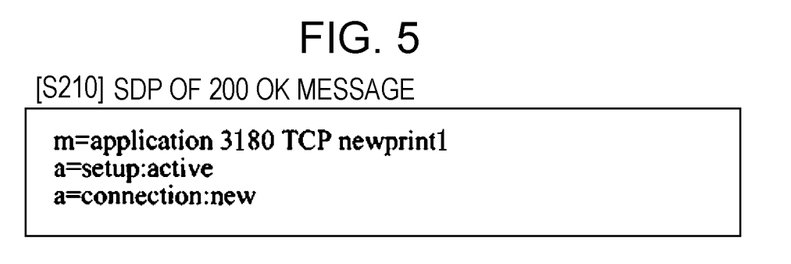
FIG. 5 is an explanatory diagram illustrating an example of the details of the SDP of a 200 OK message.

FIG. 5 is a diagram illustrating the details of the SDP in the "200 OK" message received in step S210 by the GW 20. The "m=" line in FIG. 5 describes that the port number of an application defined as payload type "newprint1" using "the TCP" is "3180". From "newprint1" and "a=setup:active" in FIG. 5, it can be known that the terminal (here, the multi-function apparatus 30) transmitting the print contents functions as an "active side" (client) and thus this terminal transmits and receives the print contents in accordance with the HTTP. The message "200 OK" transmitted in step S220 by the GW 20 is used to establish the session in accordance with the SIP when the print contents are transmitted and received in accordance with the voice protocol. The "m=" line does not describe "newprint1" but describes "audio".

When the HGW 60 receives "200 OK" of step S220, the controller 61 transmits a response signal to the FAX apparatus 40 (step S230) and also transmits "ACK", which is a status code meaning the reception confirmation of the final response for the INVITE message, to the GW 20 (step S240). When the controller 21 of the GW 20 receives "ACK", the controller 21 transmits "ACK" to the multi-function apparatus 20 to the multi-function apparatus 30 (step S250). In the call controlling process of steps S100 to S250, the GW 20 establishes the session with the HGW 60 in accordance with the SIP to transmit and receive the print contents in accordance with the voice protocol and also establishes the session with the multi-function apparatus 30 in accordance with the SIP to transmit and receive the print contents in accordance with the HTTP.

When the above-described call controlling process ends, the controller 41 of the FAX apparatus 40 first transmits a "CNG (calling tone)", which requests initialization of FAX communication to the HGW 60 as a FAX communication initiating process of preparing the FAX communication (step S260). Then, the controller 61 of the HGW 60 transmits the received "CNG" to the GW 20 (step S270). When the controller 21 of the GW 20 receives the "CNG", the controller 21 transmits a "CED (called terminal identification)" indicating that the FAX communication can be initiated to the HGW 60 (step S280). When the controller 61 of the HGW 60 receives the "CED", the controller 61 transmits the "CED" to the FAX apparatus 40 (step S290). The FAX communication initiating process of steps S260 to S290 is a process defined the voice protocol and the T.30 protocol and is normally performed such that the transmitting terminal transmits the "CNG" and the receiving terminal transmits the "CED" as a response. The multi-function apparatus 30 is an apparatus which transmits and receives the print contents in accordance with the HTTP. Since the multi-function apparatus 30 does not perform the FAX communication initiating process, the GW 20 receives the "CNG" and transmits the "CED". The FAX apparatus 40 prepares the FAX communication by the FAX communication initializing process.

When the FAX communication initializing process ends, the controller 21 of the GW 20 first transmits a "DIS (Digital Identification Signal)" to the HGW 60 as a capability adjusting process of adjusting the capability used to transmit and receive the print contents at this time (step S300). The "DIS (Digital Identification Signal)" includes receiving-side temporary capability information on a receiving side temporary capability of receiving and printing the print contents by the transmitting terminal and temporary communication rate information on a temporary communication rate serving as a communication rate of the receiving side. The "DIS" is 64-bit information. The receiving-side temporary capability information contains the sizes of image data which can be received and printed, the resolution of the image data, the kinds of encoding such as tiff or jpeg by which the print contents are generated, and kinds of color such as color or monochrome. Here, in the capability expressed by the receiving-side temporary capability information, the sizes of the image data are A4 and B5, the resolution of the image data is 200×200 dpi, the kind of encoding is tiff, and the kinds of color are color and monochrome. In addition, the communication rate expressed by the temporary communication rate information is 14.4 kbit/second. The receiving-side temporary capability information and the temporary communication rate information are stored in advance in the memory 24. When the HGW 60 receives the "DIS", the controller 61 transmits the received "DIS" to the FAX apparatus 40 (step S310).

When the FAX apparatus 40 receives the "DIS" of step S310, the controller 41 determines a use capability for transmitting and receiving the print contents at this time in the range of a transmitting side capability, which is a capability of transmitting the print contents by the FAX apparatus 40, and the range of a capability expressed by the receiving-side temporary capability information contained in the "DIS" (step S320). Specifically, the maximum capability contained in both the transmitting side capability and the receiving side capability is determined as the use capability. In the transmitting side capability of the FAX apparatus 40 according to this embodiment, the sizes of the image data are A4 and B5, the resolution of the image data is 200×200 dpi, the kind of encoding is tiff, and the kinds of color are color and monochrome. Therefore, in the use capability, A4 is determined as the size of the image data, 200×200 dpi is determined as the resolution of the image data, tiff is determined as the kind of encoding, and color is determined as the kind of color. For example, when the kind of color in the transmitting side capability of the FAX apparatus 40 is monochrome, the transmitting side capability is monochrome and the receiving side temporary capability is color and monochrome. Therefore, monochrome which is the maximum capability contained in the both is determined as the use capability. Subsequently, the controller 41 determines a communication rate used to transmit and receive the print contents at this time in the range of the communication rate of the FAX apparatus 40 and the rage of the communication rate expressed by the temporary communication rate information contained in the "DIS" (step S330). In this embodiment, the communication rate of the FAX apparatus 40 is 9.6 kbit/second. Therefore, 9.6 kbit/second and 14.4 kbit/second expressed in the temporary communication rate information are compared to each other. At this time, 9.6 kbit/second is determined as the communication rate used at this time.

When the use capability and the communication rate to be used is determined, the controller 41 notifies the determined use capability the determined communication rate by transmitting a "DCS (Digital Command Signal)", which contains use capability information indicating the use capability and communication rate information indicating the determined communication rate, to the HGW 60 (step S340). When the HGW 60 receives the "DCS", the controller 61 transmits the received "DCS" to the GW 20 (step S350). In this way, the GW 20 can know the use capability and the communication rate used in the FAX apparatus 40 by transmitting and receiving the print contents at this time.

Figure 6:
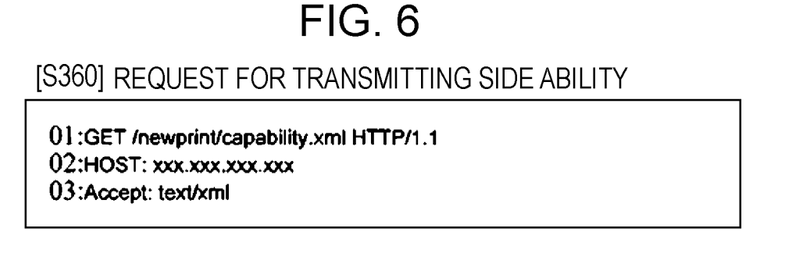
FIG. 6 is an explanatory diagram illustrating an example of the details of a transmitting side capability request.

On the other hand, when the call controlling process ends, the controller 31 of the multi-function apparatus 30 transmits a transmitting side capability request to the GW 20 as the capability adjusting process (step S360). The transmitting side capability request is made to transmit transmitting-side capability information, which indicates the capability of transmitting the print contents by the transmitting terminal, to the multi-function apparatus 30. FIG. 6 is an explanatory diagram illustrating an example of the details of the transmitting side capability request. Line 01 of the transmitting side capability request describes a command "GET" indicating a "request" and "newprint/capability.xml" indicating the URL of the initial request described in the INVITE message received from the GW 20 in step S170. Line 02 describes the IP address of the FAX apparatus 40 obtainable from the INVITE message received from the GW 20 in step S170. Line 03 describes the acceptance of an XML text. The transmission of the transmitting side capability request in step S360 can be performed after the call controlling process ends. Therefore, the process of step S360 may be performed while the FAX communication initializing process, for example.

When the GW 20 receives the "DCS" of step S350 and the transmitting side capability request of step S360, the controller 21 sets the capability expressed in the use capability information contained in the "DCS" and transmits a transmitting side capability response, which contains the transmitting-side capability information indicating the transmitting side capability, to the multi-function apparatus 30 (step S370).

FIG. 7 is an explanatory diagram illustrating an example of the transmitting side capability response. Line 01 of the transmitting side capability response describes "200 OK" meaning success of the request. Line 02 means that the kind of contents is an XML text. Line 03 describes the length of the contents. The transmitting-side capability information is described in Line 08 to Line 40. In this example, the size ("MediaSize" in Line 10) of an image to be transmitted is the A4 size (Line 14). The resolution ("PrintQuality" in Line 19) is 200×200 dpi (Line 21). The kind of encoding ("DocumentFormat" in Line 27) is tiff ("img/tiff" in Line 29). The kind of color ("Mono-Color" in Line 33) is color (Line 35). That is, the capability expressed in the use capability information received in step S350 is transmitted as the transmitting side capability to the multi-function apparatus 30. Line 42 of the transmitting side capability response describes the URL ("newprint/capability1.xml") used when page information is requested from the terminal receiving the print contents at next time. The URL is the opponent address of the IP address "xxx.xxx.xxx.xxx" (HOST: xxx.xxx.xxx.xxx of Line 02 in FIG. 6) of the FAX apparatus 40 described in accordance with the SDP in the INVITE message transmitted in step S170 by the controller 21. Line 43 describes the URL ("newprint/event/") used to receive status change information. The URL used to receive the status change information is a URL used for the GW 20 to receive information from the multi-function apparatus 30 when a status is different from a normal status of the terminal receiving the print contents, for example, when a paper sheet is jammed upon printing the received print contents.

When the multi-function apparatus 30 receives the transmitting side capability response of step S370, the controller 31 determines the use capability used to transmit and receive the print contents at this time in the range of the transmitting side capability expressed by the transmitting-side capability information contained in the transmitting side capability response and the range of the receiving side capability of receiving and printing the print contents by the multi-function apparatus 30 (step S380). In the receiving side capability of the multi-function apparatus 30 according to this embodiment, the sizes of an image are A3, B4, A4, and B5 sizes, the resolutions are 200×200 dpi, 300×300 dpi, and 400×400 dpi, the kind of encoding is tiff, and the kinds of color are color and monochrome. Therefore, since the receiving side capability of the multi-function apparatus 30 is equal to or higher than the transmitting side capability expressed by the transmitting-side capability information contained in the transmitting side capability response, the controller 31 just determines the transmitting side capability as the use capability.

The capability adjusting process of steps S260 to S380 ends. Here, in accordance with the voice protocol and the T.30 protocol, the receiving terminal transmits the receiving side capability information and the transmitting terminal determines the use capability and notifies the determined use capability to the receiving terminal. On the other hand, when the print contents are transmitted and received in accordance with the HTTP defined in "newprint1", the receiving terminal functions as a client in the server-client model. Therefore, the receiving terminal makes the transmitting side capability request and acquires the transmitting-side capability information. The receiving terminal determines the use capability. Accordingly, when the FAX apparatus 40 serves as the transmitting terminal and the multi-function apparatus 30 serves as the receiving terminal, both the FAX apparatus 40 and the multi-function apparatus 30 tries to acquire the opponent capability and determine the use capability. Here, the GW 20 first transmits the receiving side temporary capability stored in advance in the memory 24 to the FAX apparatus 40 and permits the FAX apparatus 40 to determine the use capability. Then, the GW 20 receives the determined use capability from the FAX apparatus 40, transmits the use capability as the transmitting side capability to the multi-function apparatus 30, and permits the multi-function apparatus 30 to determine the use capability. In this way, both the protocols of the FAX apparatus 40 and the multi-function apparatus 30 can be satisfied. The GW 20 stores the capability lower than the receiving side capability of the multi-function apparatus 30 as the receiving side temporary capability in the memory 24 in advance. For example, the minimum capability of a general multi-function apparatus may be stored as the receiving side temporary capability in advance. Alternatively, the unique identity information of the multi-function apparatus 30 and the receiving side capability with the multi-function apparatus 30 may be associated with each other in advance to be stored in the memory 24. In this way, the use capability determined by the FAX apparatus 40 falls in the range of the transmitting side capability of the multi-function apparatus 30, the use capability determined in step S320 by the FAX apparatus 40 and the use capability determined in step S380 by the multi-function apparatus 30 can be set as the same capability. In accordance with the voice protocol and the T.30 protocol, the receiving terminal transmits the communication rate information of the receiving side as well as the receiving side capability information. Moreover, the transmitting terminal determines the communication rate at which the print contents are transmitted and received. However, since the communication rate is not determined for the HTTP defined in "newprint1", the GW 20 permits the stored temporary communication rate information to be contained in the "DIS", transmits the temporary communication rate information to the HGW 60 in step 300, and permits the FAX apparatus 40 to determine the communication rate to be used at this time. The communication rate expressed in the temporary communication rate information may be equal to the communication rate of a general FAX apparatus or may be the fastest communication rate among the communication rates of the general FAX apparatus so that the highest communication rate of the transmitting terminal is determined as the communication rate to be used at this time.

When the above-described capability adjusting process ends, the controller 41 of the FAX apparatus 40 transmits a "TCF (training Check)", which is a training signal, as the communication rate determined in step S330, to the HGW 60 as a line status confirming process of confirming the status of a communication line between the FAX apparatus 40 and the GW 20 (step S390). Subsequently, the controller 61 of the HGW 60 transmits the received "TCF" to the GW 20 (step S400). The controller 21 of the GW 20 transmits a "CFR (confirmation to receive)", which is a signal indicating that there is no error, to the HGW 60, when no error occurs even in one bit of the "TCF" (step S410). The controller 61 of the HGW 60 transmits the received "CFR" to the FAX apparatus 40 (step S420). In the line status confirming process of steps S390 to S420, it is determined that the print contents after the confirmation of carrying out the communication at the communication rate notified in step S330 are transmitted and received at this communication rate. The line status confirming process is a process defined in the voice protocol and the T.30 protocol and is performed normally between the transmitting terminal and the receiving terminal. The multi-function apparatus 30 is an apparatus capable of transmitting and receiving the print contents in accordance with the HTTP. The line status confirming process is not performed in the multi-function apparatus 30. For this reason, the GW 20 serves as the receiving terminal to receive the "TCF" and transmit the "CFR". When there is an error in the "TCF" received in step S400 by the GW 20, even though illustrated in FIG. 2, the controller 21 transmits an "FTT (Failure To Train)", which is a signal indicating that there is an error, to the FAX apparatus 40 via the HGW 60. Then, the controller 41 of the FAX apparatus 40 decreases the communication rate by one step and again transmits the "TCF" to the HGW 60. The communication rate when the GW 20 receives the "CFR" is determined as the final communication rate to be used at this time, by decreasing the communication rate step by step and repeatedly transmitting and receiving the "TCF" and the "FTT".

When the line status confirming process ends, the controller 41 of the FAX apparatus 40 generates one-page print contents data generated in the format used in the T.30 protocol and performs a print contents transmitting/receiving process of transmitting the print contents from the FAX apparatus 40 to the multi-function apparatus 30 by transmitting the one-page print contents data and the use capability determined in step S320 to the HGW 60 at the communication rate determined in the line status confirming process (step S430) (see FIG. 3). The print contents data corresponding to one page is generated by permitting the scan executing unit 43 to scan a document set by a user of the FAX apparatus 40 before the call controlling process. The HGW 60 receives the print contents data corresponding to one page transmitted in step S430 from the FAX apparatus 40, sequentially converts the print contents data into IP packets used in the voice protocol, and transmits the IP packets to the GW 20 (step S440). The GW 20 sequentially receives the print contents data from the FAX apparatus 40 and stores the received print contents data in the memory 24.

Figure 9:
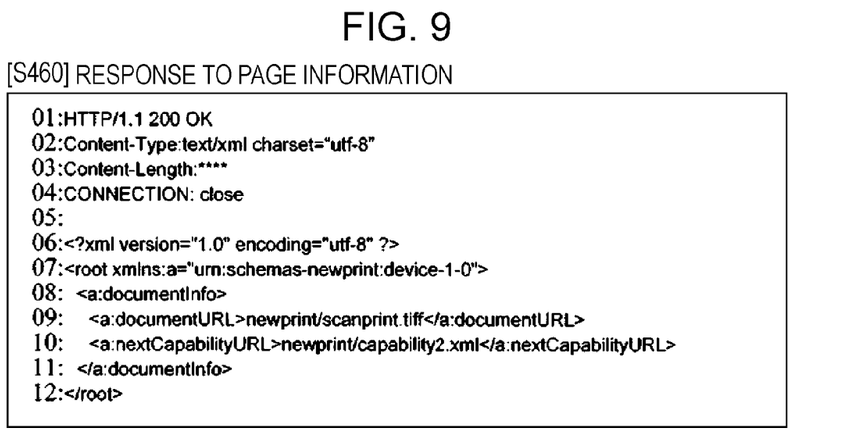
FIG. 9 is an explanatory diagram illustrating an example of the details of a page information response.

On the other hand, when the capability adjusting process ends, the controller 31 of the multi-function apparatus 30 performs the print contents transmitting/receiving process by transmitting the page information request to the GW 20 by use of the URL ("newprint/capability1.xml" of Line 42 in FIG. 7) described in the transmitting side capability response of step S370 (step S450). Subsequently, when the GW 20 receives the page information request, the controller 21 transmits the page information to the multi-function apparatus 30 (step S460). An example of the page information request is shown in FIG. 8. It can be known that "newprint/capability1.xml" described in Line 01 of the page information request is the same as "newprint/capability1.xml" described in Line 42 of the capability response in FIG. 7. An example of the page information response is shown in FIG. 9. Since Line 09 of the page information response describes URL "newprint/scanprint.tiff" of the print contents data corresponding to one page, it can be known that Line 10 describes URL "newprint/capability2.xml" of the next page in the print contents. The controller 31 of the multi-function apparatus 30 receives the page information response from the GW 20. Then, the controller 31 acquires the URL, when the URL of the print contents data is present in the page information response or the URL of the next page is present in the print contents.

Figure 10:
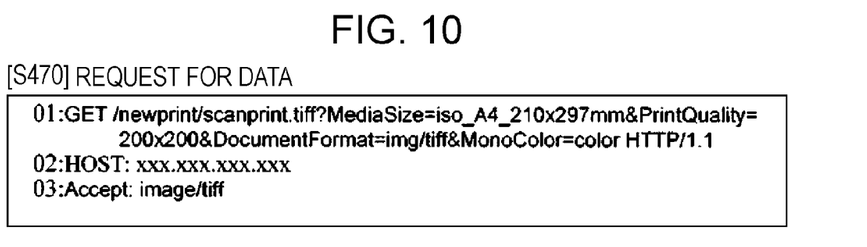
FIG. 10 is an explanatory diagram illustrating an example of the details of a data request.

Subsequently, the controller 31 of the multi-function apparatus 30 transmits a data request for transmitting the print contents data to the GW 20 by using the URL ("newprint/scanprint.tiff" described in Line 09 of the page information response in FIG. 9) described in Line 09 of the page information response received in step S460 (step S470). An example of the data request is shown in FIG. 10. It can be known that "newprint/scanprint.tiff" described in Line 01 of the data request is the same as "newprint/scanprint.tiff" described in Line 09 of the page information response in FIG. 9. In the data request, the use capability determined in step S380 of the capability adjusting process by the controller 31 is also notified. Specifically, the description of "MediaSize=iso_A4_210×297 mm" in Line 01 of the data request in FIG. 10 specifies that the size of the image data is A4. The description of "PrintQuality=200×200" specifies that the resolution is 200×2000 dpi. The description of "DocumentFormat=img/tiff" specifies that the kind of encoding is tiff. The description of "MonoColor=color" specifies that the kind of color is color. By transmitting the data request, the multi-function apparatus 30 makes a request for transmitting the print contents data to the GW 20 in according with the determined use capability.

Subsequently, when the GW 20 receives the data request of step S470, the controller 21 generates a data response containing data into which the print contents data received in step S440 and stored in the memory 24 is converted in accordance with the format used in the HTTP, and then transmits the generated data response to the multi-function apparatus 30 (step S480). The print contents data received in step S440 by the GW 20 are divided into the IP packets of the format used in the voice protocol, and then the print contents data are sequentially from the HGW 60. Therefore, the controller 21 receives and stores all of the print contents data corresponding to one page in the memory 24. The controller 21 generates the data responses into which the sequentially stored print contents data are converted in accordance with the format used in the HTTP and sequentially transmits the data responses of step S480 to the multi-function apparatus 30. When the multi-function apparatus 30 receives the data responses of step S480, the controller 31 stores the print contents data contained in the data responses in the memory 34, and simultaneously controls the print executing unit 32 to print the print contents data stored in the memory 34.

On the other hand, the controller 41 of the FAX apparatus 40 terminates the process of transmitting the print contents data corresponding to one page in step S430. Moreover, when the controller 41 determines that there is the next page of the print contents, the controller 41 transmits "MPS (multipage signal)", which is a signal indicating that there is the next page, to the HGW 60 (step S490). The process of determining whether there is the next page is performed by determining whether there is a document which is set in the scan executing unit 43 and is not scanned. The controller 61 of the HGW 60 terminates the process of transmitting the print contents data corresponding to one page in step S440. Moreover, when the controller 61 receives the "MPS" of step S490, the controller 61 transmits the "MPS" to the GW 20 to inform the fact that there is the next page (step S500). When the GW 20 receives the "MPS", the controller 21 transmits an "MCF (message confirmation)", indicates that the reception of the print contents data from the HGW 60 in step S440 is completed, to the HGW 60 (step S510). The process of step S510 may be performed after the termination of the process of generating the data responses and transmitting the data responses to the multi-function apparatus 30 in step S480. When the HGW 60 receives the "MCF", the controller 61 transmits the "MCF" to the FAX apparatus 40 (step S520).

Figure 11:
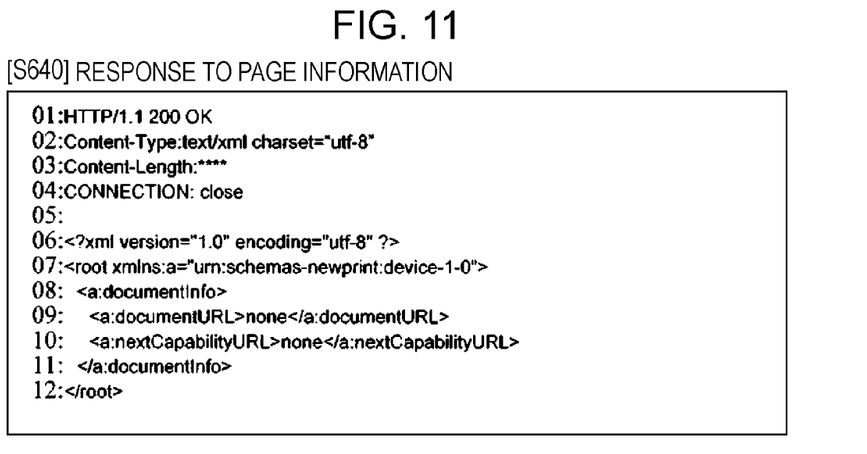
FIG. 11 is an explanatory diagram illustrating an example of the details of a page information response when there is no next page.

The page transmitting/receiving process of steps S430 to S520 is terminated by transmitting the print contents data corresponding to one page from the FAX apparatus 40 to the multi-function apparatus 30. Thereafter, the page transmitting/receiving process of steps S430 to S520 is repeated until the transmission and reception of the print contents are completed before one page. The URL described in Line 01 of the page information request in step S450 after the second page transmitting/receiving process is not the URL described in the transmitting side capability response received in step S370, but the URL of the next page in the print contents described in Line 10 of the received newest page information response. In the page transmitting/receiving process of the final page of the print contents, steps S530 to S580 are the same as steps S430 to S480, as shown in FIG. 3. However, when the transmission of the print contents data corresponding to one page in step S530 is completed, the controller 41 of the FAX apparatus 40 determines that there is no next page of the print contents and transmits "EOP (End Of Procedure)", which is a signal indicating that there is no next page, to the HGW 60 (step S590). Subsequently, the HGW 60 transmits the received "EOP" to the GW 20 to inform that there is no next page (step S600). When the GW 20 receives the "MPS", the controller 21 transmits the "MCF", which indicates that the reception of the print contents data from the HGW 60 in step S540 is completed, to the HGW 60 (step S610). Subsequently, when the HGW 60 receives the "MCF", the controller 61 transmits the "MCF" to the FAX apparatus 40 (step S620). The page transmitting/receiving process of the final page in steps S530 to S620 is terminated. However, since it is not notified whether there is the next page of the print contents data received in step S580, the multi-function apparatus 30 transmits the page information request to the GW 20 as in steps S450 and 550 (step S630). Subsequently, when the GW 20 receive the page information request, the controller 21 transmits the page information response, which indicates that there is no next page, to the multi-function apparatus 30 (step S640). An example of the page information response is shown in FIG. 11. In FIG. 11, from "none" described in Line 09 and "none" described in Line 10 in the page information response, it can be known that there is no URL of the print contents data and there is no URL of the next page. The controller 31 of the multi-function apparatus 30 receiving the page information response determines that there is no next page, since the URL of the print contents data is not described in Line 09 of the page information response.

The print contents transmitting/receiving process of steps S430 to S640 is terminated. In the print contents transmitting/receiving process, like the capability adjusting process, the GW 20 serves as the receiving terminal in accordance with the voice protocol and thus receives the print contents from the FAX apparatus 40. Simultaneously, the GW 20 serves as a client in the server-client model and thus transmits the print contents to the multi-function apparatus 30 in accordance with the HTTP.

When the print contents transmitting/receiving process ends, the controller 41 of the FAX apparatus 40 performs a call disconnecting process of terminating the connection by transmitting "DCN (disconnect)" to inform the disconnection of the communication to the HGW 60 (step S650). When the HGW 60 receives the "DCN", the controller 61 of the HGW 60 transmits the received "DCN" to the GW 20 (step S660). Subsequently, the controller 41 of the FAX apparatus 40 transmits a disconnection signal after the transmission of the "DCN" of step S650 (step S670). When the HGW 60 receives the disconnection signal, the controller 61 transmits "BYE", which is a status code indicating the termination of the session, to the GW 20 (step S680). When the GW 20 receives the "BYE", the controller 21 transmits "200 OK" to the HGW 60 (step S690) to terminate the connection with the FAX apparatus 40. When the print contents transmitting/receiving process ends, the controller 31 of the multi-function apparatus 30 performs the call disconnecting process by transmitting "BYE" to the GW 20 (step S700). When the GW 20 receives "BYE", the controller 21 transmits "200 OK" to the multi-function apparatus 30 (step S710) to terminate the connection with the multi-function apparatus 30.

Here, a correspondence relation between the constituent elements according to the first embodiment and the constituent element according to the invention will be described. The FAX apparatus 40 and the HGW 60 according to the first embodiment correspond to a transmitting terminal according to the invention. The multi-function apparatus 30 corresponds to a receiving terminal. The GW 20 corresponds to a gateway. The memory 24 corresponds to a memory unit. The controller 21 performing the call controlling process corresponds to a connection establishing unit. The controller 21 performing the print contents transmitting/receiving process corresponds to a print contents transmitting/receiving unit. The controller 21 performing the capability adjusting process corresponds to a use capability adjusting unit. The voice protocol corresponds to the FAX protocol.

According to the above-described first embodiment, the controller 21 of the GW 20 establishes the connection of the HGW 60 and the FAX apparatus 40 with the multi-function apparatus 30 in accordance with the SIP on the basis of the reception of the INVITE message transmitted from the HGW 60. When the connection is established, the print contents are received in the format used in the voice protocol from the FAX apparatus 40 and the HGW 60 and the received print contents are stored in the memory 24. When the data request for requesting the print contents data is received in the format used in the HTTP from the multi-function apparatus 30, the print contents data stored in the memory 24 are converted into the data of the format used in the HTTP and transmitted to the multi-function apparatus 30. In this way, the print contents can be transmitted from the FAX apparatus 40 and the HGW 60, which transmit the print contents in accordance with the voice protocol, to the multi-function apparatus 30, which receive the print contents in accordance with the HTTP and prints the print contents. The controller 21 of the GW 20 transmits the "DIS" containing the receiving side temporary information, which is the capability lower than the receiving side capability of the multi-function apparatus 30, to the FAX apparatus 40 to perform the capability adjusting process and permits the FAX apparatus 40 to determine the use capability. When the controller 21 receives the transmitting side capability request from the multi-function apparatus 30, the controller 21 also performs the transmitting side capability response by transmitting the use capability received from the FAX apparatus 40 as the transmitting side capability to the multi-function apparatus 30. The use capability determined in the range of the transmitting side capability and the range of the receiving side temporary capability by the FAX apparatus 40 becomes the same as the capability determined in the range of the use capability and the range of the receiving side capability by the multi-function apparatus 30. Therefore, the print contents can be printed appropriately by the multi-function apparatus 30 by transmitting the print contents from the FAX apparatus 40 to the multi-function apparatus 30 in accordance with the use capability. The process of receiving the print contents data of steps S440 and S540 and storing the print contents data in the memory 24 is performed together with the process of transmitting the stored print contents data to the multi-function apparatus 30 in steps S480 and S580. Therefore, the transmission of the print contents from the FAX apparatus 40 to the multi-function apparatus 30 is completed in a short time and the storage size of the memory 24 can be reduced, compared to a case where all of the print contents are received and then transmitted to the multi-function apparatus 30. Moreover, the "MPS" or the "EOP" indicating whether there is the next page data in steps S500 and S600 is received in the format of the voice protocol from the FAX apparatus 40 and the HGW 60 whenever the data corresponding to one page in the print contents are received in steps S440 and S540 from the FAX apparatus 40 and the HGW 60. The page information response containing the information indicating whether there is the next page on the basis of the received "MPS" or the received "EOP" is transmitted to the multi-function apparatus 30 in the format used in the HTTP when the request is made from the multi-function apparatus 30 in the format used in the HTTP so as to transmit the page information responses whenever the data corresponding to one page in the print contents are transmitted to the multi-function apparatus 30 in steps S480 and S580. Therefore, it is possible to obtain the advantage of notifying the multi-function apparatus 30 appropriately whether there is the data of the next page for each page.

Second Embodiment

Figure 12:
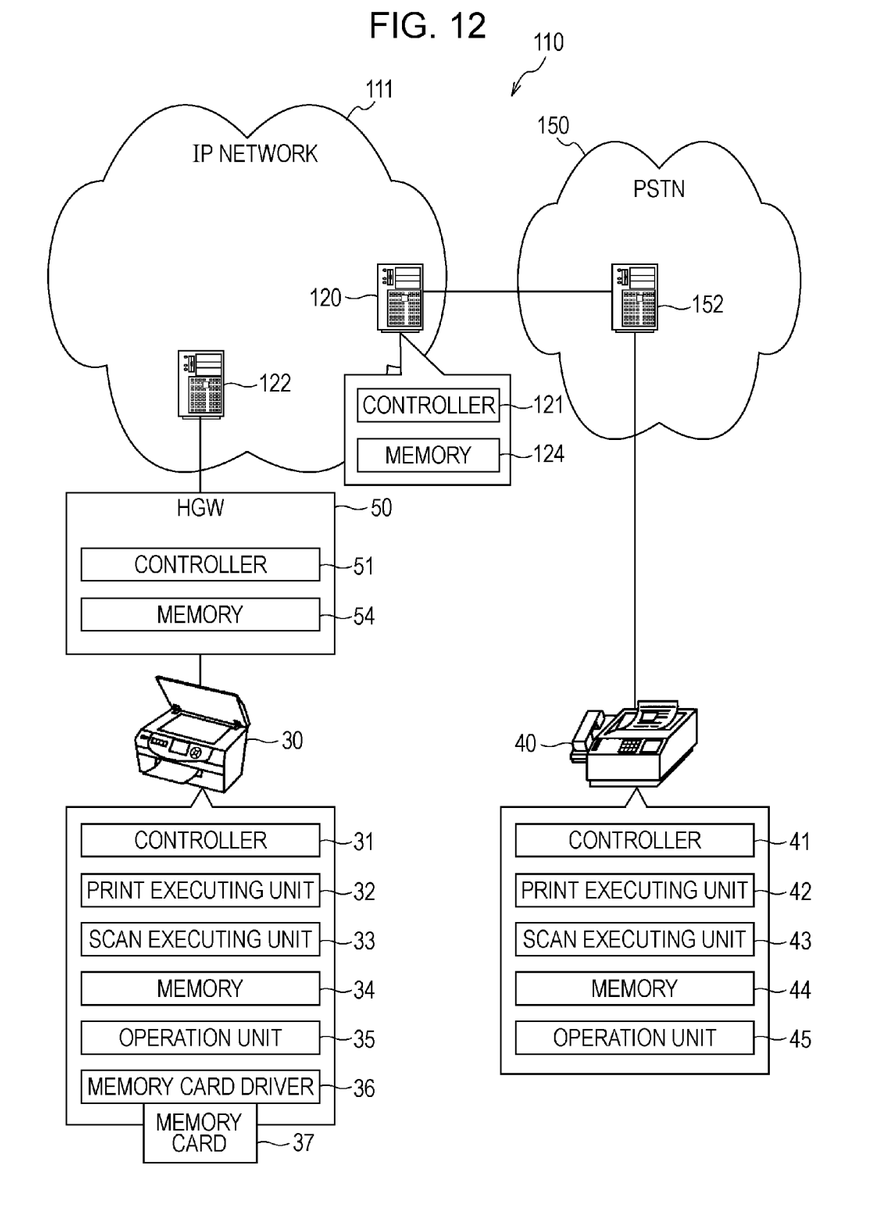
FIG. 12 is a diagram illustrating the configuration of a printing system including a gateway according to a second embodiment.

Next, a second embodiment will be described. FIG. 12 is a diagram illustrating an exemplary overall configuration of a printing system 110 including a gateway (GW) 120 according to the second embodiment. The same reference numerals are given to the same constituent elements of the printing system 110 as those of the printing system 10, and the description is omitted.

As shown in FIG. 12, the printing system 110 includes an IP network 111 including the GW 120 and as SIP proxy server 122 and a PSTN (Public Switched Telephone Networks) 150 being connected to the GW 120 and including a switching apparatus 152. The multi-function apparatus 30 is connected to the IP network 111 via the HGW 50. The FAX apparatus 40 is connected to the PSTN 150 without being connected to an HGW.

The IP network 111 is constructed as the next generation network (NGN), for example, as in the IP network 11. The IP network 111 includes the GW 120, an SIP proxy server 122, an SIP proxy server (not shown) which relays an IP message, and a location server (not shown) which stores location information of a user agent.

The GW 120 is an apparatus which converts a protocol and data and which can exchange data between the IP network 111 and the PSTN 150. Specifically, the GW 120 converts the protocol between data used in the HTTP protocol and data used in the T.30 protocol, which is one of FAX protocols, and mutually converts the data. The GW 120 carries out connection between an apparatus (for example, the multi-function apparatus 30) capable of transmitting and receiving the print contents in accordance with the HTTP protocol and an apparatus (for example, the FAX apparatus 40) capable of transmitting and receiving the print contents in accordance with the T.30 protocol and performs the transmission and reception of the print contents. The GW 120 includes a controller 121 controlling the entire apparatus and a memory 124 storing various programs executed by the controller 121 or temporarily storing data. The GW 120 has not a function of the SIP proxy server, unlike the first embodiment.

The SIP proxy server 122 is an apparatus which establishes and cuts connection between user agents connected to the IP network 111 in accordance with the SIP. Since the SIP proxy server 122 is connected to the multi-function apparatus 30, the SIP proxy server 122 is capable of relaying the IP message between the multi-function apparatus and the GW 120.

Since the PSTN 150 is constructed as a public telephone network, the PSTN 150 includes other switching apparatuses (not shown) in addition to the switching apparatus 152. The switching apparatus 152 is an apparatus which establishes a connection between FAX apparatuses connected to the PSTN 150 or between telephone terminals connected to the PSTN 150. The switching apparatus 152 is capable of relaying data between the GW 120 and the FAX apparatus 40 in accordance with the T.30 protocol.

Figure 13:
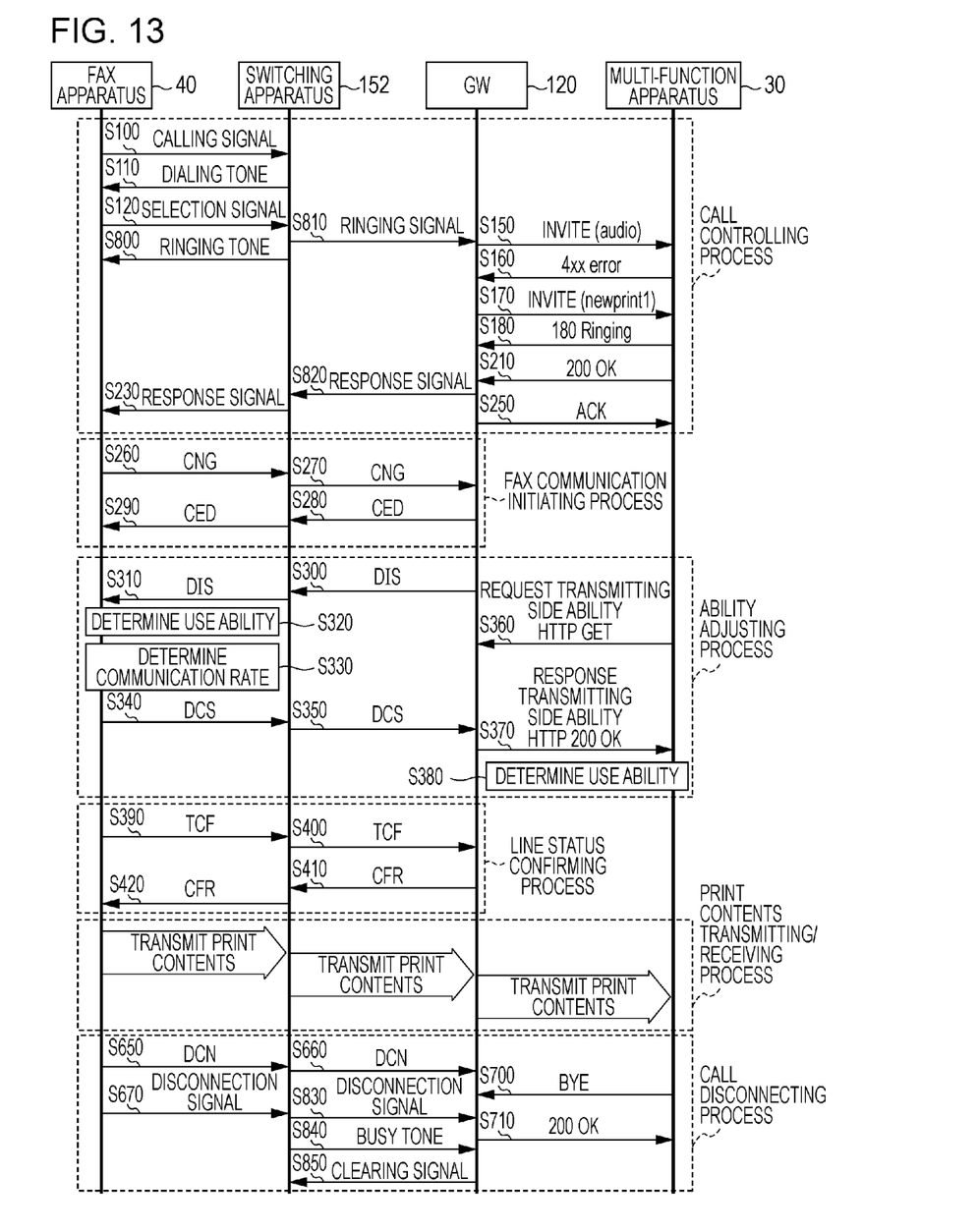
FIG. 13 is an explanatory diagram illustrating a sequence according to the second embodiment.

Next, the operation of the GW 120 having the above-described configuration according to this embodiment, and particularly the operation of the GW 120 when print contents are transmitted from the FAX apparatus 40 to the multi-function apparatus 30 will be described. FIG. 13 is an explanatory diagram illustrating a sequence in which the FAX apparatus 40 and the multi-function apparatus 30 establish connection via the switching apparatus 152 and the GW 120, the print contents are transmitted and received, and then the connection is cut. In each process performed in this sequence, the same step numbers are given to the same steps of the sequence as those described with reference to FIG. 2, and the description is omitted. In FIG. 13, the description of the HGW 50 and the SIP proxy server 122 is omitted. However, the multi-function apparatus 30 and the GW 120 transmit and receive the data via the SIP proxy server 122 and the HGW 50 in effect.

The transmission of the print contents from the FAX apparatus 40 to the multi-function apparatus 30 is initiated by a user of the FAX apparatus 40, as in the first embodiment, and steps S100 to S120 described above are performed between the FAX apparatus 40 and the switching apparatus 152. The switching apparatus 152 receiving the selection signal of step S120 transmits a ringing tone, which means that a call is being performed, to the FAX apparatus 40 (step S800). The switching apparatus 152 determines that the receiving terminal is not the PSTN 150 but a terminal connected to the IP network 111 on the basis of the received selection signal (the unique identity information of the multi-function apparatus 30 input by the user of the FAX apparatus 40), and then transmits a ringing signal to the GW 120 (step S810).

When the GW 120 receives the ringing signal, the controller 121 transmits the INVITE message, which describes "audio" in the "m=" line used in the voice protocol, to the SIP proxy server 122. The SIP proxy server 122 specifies the URI of the multi-function apparatus 30 on the basis of the unique identity information of the multi-function apparatus 30 described in the header of the INVITE message, and then transmits the INVITE message to the multi-function apparatus 30 (step S150). Subsequently, since the multi-function apparatus 30 does not support the voice protocol, the controller 31 transmits a "4xx error" to the GW 120 (step S160). When the GW 120 receives the "4xx error", the controller 121 transmits the INVITE message, which does not describe "audio" in the "m=" line but describes "newprint1", as in the first embodiment, to the multi-function apparatus 30 (step S170). The "C=" line of the INVITE message transmitted by the GW 120 describes the IP address of the FAX apparatus 40 serving as the transmitting terminal in the first embodiment. However, in the second embodiment, since the FAX apparatus 40 is not connected to the IP network 111, the GW 20 may determine an arbitrary IP address (for example, the IP address of the GW 20).

Subsequently, when the multi-function apparatus 30 receives the INVITE message of step S170, the controller 31 transmits "180 Ringing" as a response to the GW 120 (step S180), prepares the session establishment, and then transmits "200 OK" to the GW 120 (step S210). Subsequently, when the GW 120 receives "200 OK" from the multi-function apparatus 30, the controller 121 transmits the response signal to the switching apparatus 152 (step S820) and transmits "ACK" to the multi-function apparatus 30 (step S250). Subsequently, when the switching apparatus 152 receives the response signal from the GW 120, the switching apparatus 152 transmits the response signal to the FAX apparatus 40 (step S230). In the call controlling process, the GW 120 establishes the connection with the FAX apparatus 40 via the switching apparatus 152 in accordance with the T.30 protocol to transmit and receive the print contents, and also establishes the session with the multi-function apparatus 30 in accordance with the SIP to transmit and receive the print contents in accordance with the HTTP protocol.

The FAX communication initializing process, the capability adjusting process, the line status confirming process, and the print contents transmitting/receiving process are different from those of the first embodiment in that the GW 120 transmits and receives the data to and from the FAX apparatus 40 via the switching apparatus 152 not the HGW 60 and the data exchanged between the GW 120 and the switching apparatus 152 are data of the format which is used not in the voice protocol but in the T.30 protocol. The processing sequence or the details of the data are the same. The description of the same is omitted and the print content transmitting/receiving process is not illustrated.

When the print content transmitting/receiving process ends, the switching apparatus 152, which receives the disconnection signal of step S670 in the process of step S650 to S670 as the call disconnecting process as in the first embodiment, transmits the disconnection signal to the GW 120 (step S830) and sends a busy tone (step S840). When the GW 120 receives the disconnection signal, the controller 121 transmits a clearing signal to the switching apparatus 152 (step S850). In this way, the connection with the FAX apparatus 40 is terminated. When the print contents transmitting/receiving process ends, the controller 31 of the multi-function apparatus 30 transmits "BYE" to the GW 20 as the call disconnecting process, as in the first embodiment (step S700). When the GW 20 receives "BYE", the controller 21 transmits "200 OK" to the multi-function apparatus 30 (step S710) to terminate the connection with the multi-function apparatus 30.

Here, a correspondence relation between the constituent elements according to the second embodiment and the constituent element according to the invention will be described. The FAX apparatus 40 according to the second embodiment corresponds to a transmitting terminal according to the invention. The multi-function apparatus 30 corresponds to a receiving terminal. The GW 120 corresponds to a gateway. The memory 124 corresponds to a memory unit. The controller 121 performing the call controlling process corresponds to a connection establishing unit. The controller 121 performing the print contents transmitting/receiving process corresponds to a print contents transmitting/receiving unit. The controller 121 performing the capability adjusting process corresponds to a use capability adjusting unit. The T.30 protocol corresponds to the FAX protocol.

In the above-described second embodiment, the same advantages as those of the first embodiment can also be obtained. That is, there can be obtained the advantage of transmitting the print contents from the FAX apparatus 40 and the HGW 60 transmitting the print contents in accordance with the T.30 protocol to the multi-function apparatus 30 receiving the print contents in accordance with the HTTP protocol and printing the print contents. There can be obtained the advantage of transmitting the print contents from the FAX apparatus 40 to the multi-function apparatus 30 appropriately in accordance with the use capability by performing the capability adjusting process by the controller 121 so that the multi-function apparatus 30 prints the print contents. There can be obtained the advantage of completing the transmission of the print contents from the FAX apparatus 40 to the multi-function apparatus 30 in a short time and reducing the storage size of the memory 24, compared to the case where the multi-function apparatus 30 receives all of the print contents and then transmits the print contents to the multi-function apparatus 30. There can be obtained the advantage of notifying the multi-function apparatus 30 appropriately whether there is the next page data in each page.

The invention is not limited to the above-described embodiments, but may be modified in various forms without departing from the technical scope of the invention.

For example, in the above-described embodiments, the GW 20 and the GW 120 transmits the page information response describing one page URL of the print contents data in Line 09 to reply the page information request from the multi-function apparatus 30. However, the page unit URL may not be described, but a URL for acquiring all of the print contents may be described. In this case, the print contents data may be transmitted from the FAX apparatus 40 to the GW 20 and stored sequentially in the memory 24 and 124 in a unit of one page, as described above. Moreover, the transmission of the print contents from the GW 20 to the multi-function apparatus 30 may be performed as the data response for the one-time data request.

In the print contents transmitting/receiving process according to the above-described embodiments, the GW 20 and GW 120 receiving the print content data corresponding to one page in steps S440 and S540 perform the process of storing the print contents data in the memory 24, convert the sequentially stored print contents data into the data of the format used in the HTTP protocol, generate the data responses, and sequentially transmit the data responses to the multi-function apparatus 30 in steps S480 and S580. However, the process of steps S480 and S580 may be performed after the reception of steps S440 and S540.

In the above-described embodiments, the GW 20 and GW 120 perform the print contents transmitting/receiving process after performing the capability adjusting process of determining the use capability. However, the GW 20 and GW 120 may not perform the capability adjusting process.

In the above-described embodiments, the GW 20 and GW 120 transmit the data response containing the print contents data corresponding to one page to the multi-function apparatus 30. However, the print contents data corresponding to one page may be separately transmitted. For example, the multi-function apparatus 30 may add information indicating the length of the data requested as the data response to the data request and may transmit the data response to the GW 20 and the GW 120. In this case, the GW 20 and the GW 120 transmit the print contents data corresponding to one page by transmitting and receiving the data requests and the data responses several times. In this way, the multi-function apparatus 30 may designate the appropriate length of the data in accordance with the print speed of the print executing unit 32 of the multi-function apparatus 30 or the vacant capability of the memory 34 and may receive the print contents data.

The GW 20 according to the above-described first embodiment includes the function of the SIP proxy server, but may not have the function of the SIP proxy server. In this case, in the process of steps S130 to S160, for example, the SIP proxy server relays the data between the HGW 60 and the multi-function apparatus 30 instead of the GW 20. When the SIP proxy server receives the "4xx error" of step S160, the conversion of the data and the protocol is performed between the HGW 60 and the multi-function apparatus 30 by the GW 20 capable of converting the data and the protocol between the voice protocol and the HTTP protocol in the subsequent process. Then, the process subsequent to step S170 may be performed as in the above-described first embodiment. Even in this case, the same advantages as those of the first embodiment can be obtained. The GW 120 according to the second embodiment may have the function of the SIP proxy server. The GW 20 and the GW 120 may determine whether the multi-function apparatus 30 is an apparatus transmitting and receiving the print contents in accordance with either the voice protocol or the HTTP protocol, on the basis of the received unique identity information of the multi-function apparatus 30. This determination may be performed by acquiring information indicating that an apparatus specified by the URL upon transmitting identity information to the location server and acquiring the corresponding URI is an apparatus transmitting and receiving the print contents in accordance with a certain protocol and by using the information. Moreover, the GW 20 and the GW 120 may have the function of the location server in addition to the function of the SIP proxy server. The GW 20 and the GW 120 may associate and store unique identity information of the apparatus, the URI of the apparatus, and information indicating that the apparatus transmits and receives the print contents data in accordance with the HTTP protocol or the FAX protocol. In this way, the GW 20 and the GW 120 may determine whether the apparatus specified by the identity information transmits and receives the print contents data in accordance with the HTTP protocol or the FAX protocol.

In the above-described embodiments, the multi-function apparatus 30 includes the scan executing unit 33 and the memory card driver 36. However, as long as the print contents data can be received in accordance with the HTTP protocol, any apparatus may be used and a part or the whole of the configuration may not be included.

In the above-described first embodiment, the FAX apparatus 40 transmits and receives the print contents data with the GW 20 via the HGW 60 in accordance with the voice protocol. However, the FAX apparatus 40 may be an apparatus capable of transmitting and receiving the print contents data in accordance with the voice protocol. In this case, the HGW 60 may not be provided or may just relay the data.

In the above-described embodiments, the GW 20 converts the protocol and the data between the voice protocol and the HTTP protocol and the GW 120 converts the protocol and the data between the T.30 protocol and the HTTP protocol. However, any gateway may be used as long as the gateway can converts a signal between the transmitting terminal capable of transmitting the printable print contents in accordance with the FAX protocol and the receiving terminal capable of receiving the print contents in accordance with the HTTP protocol and printing the print contents. For example, a signal may be converted between the FAX apparatus corresponding to one of G1, G2, and SuperG3 transmitting and receiving the print contents in the T.30 protocol and the multi-function apparatus 30. A signal may be converted between the HTTP protocol and another FAX protocol different from the voice protocol and the T.30 protocol. Examples of another FAX protocol include the T.38 protocol (real-time type) and a protocol of the FAX apparatus corresponding to G4. These protocols are different from the voice protocol or the T.30 protocol in a data format. However, since the processing sequence and the data details of the protocols are the same as those of the voice protocol or the T.30 protocol, the gateway according to the invention is applicable, as in the above described GW 20 and GW 120.

In the above-described first embodiment, the GW 20 is located in the IP network 11. However, the GW 20 may be located outside the IP network 11. For example, the HGW 50 or the HGW 60 may have the function of the GW 20 excluding the function of the SIP proxy server. Even in this case, the same advantages as those of the above-described first embodiment can be obtained.

What is claimed is:

1. A gateway converting a signal between a transmitting terminal capable of transmitting printable print contents in accordance with a FAX protocol and a receiving terminal capable of receiving the print contents in accordance with an HTTP protocol and printing the print contents, the gateway comprising:

a memory unit which temporarily stores data;

a connection establishing unit which establishes connection between the transmitting terminal and the receiving terminal on the basis of reception of a connection request signal transmitted from the transmitting terminal;

a print contents transmitting/receiving unit which stores the print contents in the memory unit when receiving the print contents in a format used in the FAX protocol from the transmitting terminal after the connection establishing unit establishes the connection and which converts the print contents stored in the memory unit into data of the format used in the HTTP protocol and transmits the converted data to the receiving terminal when receiving a contents request for requesting the print contents in a format used in the HTTP protocol from the receiving terminal; and a use capability adjusting unit which transmits predetermined receiving-side temporary capability information, which indicates a capability lower than a capability of receiving and printing the print contents by the receiving terminal, to the transmitting terminal in the format used in the FAX protocol and receives use capability information, which is determined by the transmitting terminal in a range of a transmitting side capability of transmitting the print contents by the transmitting terminal and a range of a capability expressed by the receiving-side temporary capability information and indicates a capability of transmitting and receiving the print contents, from the transmitting terminal in the format used in the FAX protocol before the print contents transmitting/receiving unit receives the print contents from the transmitting terminal and receives the contents request from the receiving terminal after the connection establishing unit establishes the connection, and which transmits the received use capability information as the transmitting-side capability information to the receiving terminal in the format used in the HTTP protocol when receiving a capability request for requesting transmitting-side capability information indicating the transmitting side capability from the receiving terminal in the format used in the HTTP protocol, wherein when the print contents transmitting/receiving unit receives the content request accompanying a capability notification, which is given so as to transmit the print contents in accordance with a capability expressed in the use capability information, from the receiving terminal in the format used in the HTTP protocol, the print contents transmitting/receiving unit converts the print contents stored in the memory unit into the data of the format used in the HTTP protocol and transmits the converted data to the receiving terminal.

2. The gateway according to claim 1, wherein when the print contents transmitting/receiving unit transmits the print contents stored in the memory unit to the receiving terminal, the print contents transmitting/receiving unit sequentially converts the stored print contents into the data of the format used in the HTTP protocol and transmits the converted data to the receiving terminal without receiving all of the print contents from the transmitting terminal and waiting the print contents for being stored in the memory unit.

3. The gateway according to claim 2, wherein the print contents transmitting/receiving unit receives next page information, which indicates whether there is next page data, from the transmitting terminal in the format used in the FAX protocol whenever receiving data corresponding to one page in the print contents from the transmitting terminal, and transmits the next page information to the receiving terminal in the format used in the HTTP protocol when the receiving terminal makes a request in the format used in the HTTP protocol so as to transmit the next page information whenever transmitting the data corresponding to one page in the print contents to the receiving terminal.

* * * * *